(12) United States Patent  (10) Patent No.: US 8,582,972 B2
Small et al.  (45) Date of Patent: Nov. 12, 2013

(54) SYSTEMS AND METHODS FOR STORING OPTICAL DATA

(75) Inventors: Benjamin A. Small, New York, NY (US); Assaf Shacham, Magshimim (IL); Keren Bergman, Princeton, NJ (US)

(73) Assignee: The Trustees of Columbia University in the City of New York, New York, NY (US)

(*) Notice: Subject to any disclaimer, the term of this patent is extended or adjusted under 35 U.S.C. 154(b) by 412 days.

(21) Appl. No.: 12/438,661

(22) PCT Filed: Aug. 31, 2007

(86) PCT No.: PCT/US2007/077380
§ 371 (c)(1),
(2), (4) Date: Nov. 15, 2010

(87) PCT Pub. No.: WO2008/028125
PCT Pub. Date: Mar. 6, 2008

(65) Prior Publication Data
US 2011/0052192 A1  Mar. 3, 2011

Related U.S. Application Data

(60) Provisional application No. 60/841,352, filed on Aug. 31, 2006, provisional application No. 60/863,829, filed on Nov. 1, 2006.

(51) Int. Cl.
*H04J 14/08* (2006.01)
*G02B 6/00* (2006.01)

(52) U.S. Cl.
USPC .......................... 398/101; 385/122

(58) Field of Classification Search
USPC ................. 398/98–103; 385/15–24; 365/234
See application file for complete search history.

(56) References Cited

U.S. PATENT DOCUMENTS 4,775,216 A * 10/1988 Layton ............................ 385/12
5,032,010 A *  7/1991 Su .................................. 359/241
5,191,626 A     3/1993 Stern (Continued)

FOREIGN PATENT DOCUMENTS

EP        1 351 458    10/2003

OTHER PUBLICATIONS

U.S. Appl. No. 12/113,554, Aug. 3, 2012 Notice of Allowance.
U.S. Appl. No. 12/516,131, Aug. 24, 2012 Notice of Allowance.

(Continued)

*Primary Examiner* — Kenneth N Vanderpuye
*Assistant Examiner* — Casey Kretzer
(74) *Attorney, Agent, or Firm* — Baker Botts L.L.P.

(57) ABSTRACT

An optical data storage system and method of use thereof are presented. The optical data storage system includes one or more optical buffer modules connected in series. Each optical buffer module includes a cross connect. Each cross connect is connected, by a pair of inputs and outputs, to an optical data storage unit, for example, a fiber delay line, by a pair to either an optical packet network or a cross connect of a first adjacent buffer module in the series, and by a pair to a cross connect of a second adjacent buffer module in the series. The buffer module also includes a read signal output line which is connected to a read signal input line of the second adjacent buffer module for transmitting a read signal. A control module within each buffer module directs the passage of data through the cross connect.

19 Claims, 5 Drawing Sheets

(56) References Cited

U.S. PATENT DOCUMENTS

| | | | |
|---|---|---|---|
| 5,287,316 A * | 2/1994 | Urushidani et al. | 365/215 |
| 5,463,486 A | 10/1995 | Stevens | |
| 5,493,434 A * | 2/1996 | Sasayama et al. | 398/75 |
| 5,912,753 A | 6/1999 | Cotter et al. | |
| 6,125,112 A | 9/2000 | Koning et al. | |
| 6,268,952 B1 | 7/2001 | Godil et al. | |
| 6,385,364 B1 | 5/2002 | Abushagur | |
| 6,609,840 B2 | 8/2003 | Chow et al. | |
| 6,740,864 B1 | 5/2004 | Dries | |
| 6,751,416 B2 | 6/2004 | Cardakli et al. | |
| 6,778,536 B1 | 8/2004 | Ofek et al. | |
| 6,810,211 B1 | 10/2004 | Castanon | |
| 6,819,870 B1 * | 11/2004 | Ge et al. | 398/51 |
| 6,845,184 B1 | 1/2005 | Yoshimura et al. | |
| 6,904,239 B2 | 6/2005 | Chow et al. | |
| 6,917,739 B2 * | 7/2005 | Chen | 385/122 |
| 6,957,018 B2 | 10/2005 | Araki et al. | |
| 7,024,114 B2 | 4/2006 | Dotaro et al. | |
| 7,079,532 B2 | 7/2006 | Li | |
| 7,209,437 B1 * | 4/2007 | Hodgkinson et al. | 370/230 |
| 7,317,873 B2 | 1/2008 | Aoki | |
| 7,433,931 B2 | 10/2008 | Richoux | |
| 7,522,836 B2 | 4/2009 | Islam | |
| 7,650,081 B2 | 1/2010 | Jennen et al. | |
| 7,840,323 B2 | 11/2010 | Bour et al. | |
| 2002/0018263 A1 | 2/2002 | Ge et al. | |
| 2003/0128980 A1 | 7/2003 | Abeles | |
| 2003/0133641 A1 | 7/2003 | Yoo | |
| 2004/0213570 A1 | 10/2004 | Wai et al. | |
| 2004/0220886 A1 | 11/2004 | Kumaran et al. | |
| 2004/0258348 A1 | 12/2004 | Deliwala | |
| 2005/0063701 A1 | 3/2005 | Ovadia et al. | |
| 2005/0078666 A1 | 4/2005 | Beshai | |
| 2005/0078902 A1 | 4/2005 | Beausoleil et al. | |
| 2005/0111777 A1 | 5/2005 | Stenger et al. | |
| 2006/0285567 A1 | 12/2006 | Otoma | |
| 2008/0285971 A1 | 11/2008 | Liboiron-Ladouceur et al. | |
| 2009/0169205 A1 | 7/2009 | Bergman et al. | |
| 2011/0103799 A1 | 5/2011 | Shacham et al. | |
| 2011/0235509 A1 * | 9/2011 | Szymanski | 370/230 |

OTHER PUBLICATIONS

U.S. Appl. No. 12/054,111, Feb. 23, 2012 Final Office Action.
U.S. Appl. No. 12/054,111, Dec. 16, 2011 Response to Non-Final Office Action.
U.S. Appl. No. 12/054,111, Aug. 19, 2011 Non-Final Office Action.
U.S. Appl. No. 12/054,111, May 20, 2011 Response to Non-Final Office Action.
U.S. Appl. No. 12/054,111, Dec. 21, 2010 Non-Final Office Action.
U.S. Appl. No. 12/113,554, Feb. 13, 2012 Response to Non-Final Office Action.
U.S. Appl. No. 12/113,554, Oct. 14, 2011 Non-Final Office Action.
U.S. Appl. No. 12/113,554, Jun. 16, 2011 Response to Non-Final Office Action.
U.S. Appl. No. 12/113,554, Mar. 21, 2011 Non-Final Office Action.
Bauknecht et al., "12Gbit/s laser diode and optical modulator drivers with InP/InGaAs double HBTs", Electronic Letters, Nov. 7, 1996; 32(23): 2156-2157.
Chamberlain et al., Gemini: An Optical Interconnection Network for Parallel Processing, IEEE Transactions on Parallel and Distributed Systems, 13(10): 1038-1055, Oct. 2002.
Chen et al., On-Chip Copper-Based vs. Optical Interconnects: Delay Uncertainty, Latency, Power, and Bandwidth Density Comparative Predictions, Jun. 2006 [online], retrieved from the Internet: <http://www.ece.rochester.edu/users/friedman/papers/IIT_06.pdf>.
Dorgeuille et al., "Fast optical amplifier gate array for WDM routing and switching applications", OFC '98 Technical Digest, Tuesday Afternoon, 1998: 42-44.
Guillemot et al., "Transparent optical packet switching: The European ACTS KEOPS project approach", Journal of Lightwave Technology, Dec. 1998; 16(12): 2117-2134.
Heirman et al., Speeding up multiprocessor machines with reconfigurable optical interconnects. In Proc. SPIE vol. 6124, optoelectronic Integrated Circuits X, Jan. 2006 [online], retrieved from the Internet: <http://eschar.elis.ugent.be/publ/Edocs/DOC/P106_036.pdf>.
Heirman et al., Reconfigurable Optical Networks for On-Chip Multiprocessors, Proceedings of the Special Workshop on Future Interconnects and Networks on a Chip, Mar. 10, 2006 (May 10, 2006) [online], retrieved from the Internet: <https://archive.ugent.be/retrieve/5767/P106_027.pdf>.
Krishnamoorthy et al., "Triggered receivers for optoelectronic VLSI", Electronic Letters, Feb. 3, 2000; 36(3): 249-250.
Mokhtari et al., "Bit-rate transparent electronic data regeneration in repeaters for high speed lightwave communication systems", Circuits and Systems, 1999. Proceedings of the 1999 IEEE International Symposium on Circuits and Systems, 1999: 508-511.
Sacham et al., "A Fully Implemented 12×12 Data vortex Optical Packet Swwitching Interconnection Network". Journal of Lightwave Technology, 23(10): 3066-3075 (2005).
Sahri et al., "A highly integrated 32-SOA gates optoelectronic module suitable for IP multi-terabit optical packet routers", Optical Fiber Communication Conference and Exhibit, 2001; vol. 4: PD32-1-PD32-3.
Schneibel et al., "High current InP double hetero bipolar transistor driver circuit for laser diodes", 11th International Conference on Indium Phosphide and Related Materials, May 1999: 455-457.
Venditti et al., "Design and test of an optoelectronic-VLSI chip with 540-element receiver-transmitter arrays using differential optical signaling", IEEE Journal of Selected Topics in Quantum Electronics, Mar./Apr. 2003; 9(2): 361-379.
U.S. Appl. No. 12/054,111, Mar. 13, 2013 Non-Final Office Action.
U.S. Appl. No. 12/516,131, filed Apr. 10, 2012 Non-Final Office Action.
U.S. Appl. No. 12/516,131, Jul. 2, 2012 Response to Non-Final Office Action.
U.S. Appl. No. 12/054,111, Jun. 22, 2012 Amendment and Request for Continued Examination (RCE).

* cited by examiner (12)

SYSTEMS AND METHODS FOR STORING OPTICAL DATA

CROSS REFERENCE TO RELATED APPLICATIONS

This application is a national phase of International Application PCT/US07/77380, filed Aug. 31, 2007, which claims priority to U.S. Provisional Patent Applications Ser. Nos. 60/841,352 and 60/863,829, filed Aug. 31, 2006 and Nov. 1, 2006, respectively, all of which are incorporated by reference herein in their entireties and from which priority is claimed.

STATEMENT REGARDING FEDERALLY SPONSORED RESEARCH

The subject matter described herein was funded in part by a grant from the U.S. Department of Defense, subcontract B-12-664. The United States Government may have certain rights under herein.

BACKGROUND

The disclosed subject matter relates to, but is not limited to, optical data transmissions, and more specifically to buffering in optical packet networks.

Techniques for buffering in optical packet networks are known. For many network topologies, packet buffering has the potential to improve network acceptance rates and thereby increase overall throughput and efficiency. However, the physical nature of optical signals prohibits the implementation of optical buffers in a manner similar to conventional electronic ones. Because, at present, buffer schemes that require slowing the speed of light in exotic materials present their own distinct challenges, schemes that instead use long loops of conventional optical fiber to delay the signals provide more opportunities for successful implementation in current systems.

Buffer architectures based on cascaded fiber delay line (FDL) modules and parallel FDL arrays have been proposed and implemented. However, a careful examination of complexities associated with the actual implementation of these structures reveals that read and write processes cannot be executed independently under physical timing requirements.

Parallel FDL structures and other architectures that allow packets to be stored for a predetermined amount of time require advanced knowledge of the packet's duration in the buffer and, hence, do not support truly independent read and write processes because the reading and writing of packets can be required to be coordinated with these predetermined storage times. For example, in this scheme, a packet stored in a buffer for x amount of time could not be retrieved from the buffer until the time x has expired. Schemes based on cascaded FDLs are difficult to construct in a way that maintains physically realizable timing and signaling necessary to serve multiple packets simultaneously. Architectures such as the 2×2 buffered switch fabrics for traffic routing, merging, and shaping in photonic cell networks cleverly address these concerns but do not guarantee packet arrival; some packets are dropped or routed incorrectly. In addition, the latency associated with packets entering empty buffers causes backlogs, especially when the network is under heavy load. Backlog results in packet drop and data loss, further taxing already loaded networks.

Many schemes only support an independent treatment of the stored packets. That is, first-come-first-served (FCFS) or first-in-first-out (FIFO) prioritization is not easily supported.

Accordingly, there exists a need for a data storage system for optical data that supports independent and simultaneous reads and writes.

SUMMARY

Optical packet buffers and methods for storage therein are described.

In some embodiments, the disclosed subject matter includes a procedure for storing data in an optical packet buffer that forms part of an optical packet network, the optical packet buffer including at least one buffer module including an optical data storage unit and a cross connect, the cross connect including two or more inputs and outputs, a first input and output adapted for connection to either a cross connect of a first, different buffer module or to the optical packet network, and a second input and output connected to the optical data storage unit, including receiving optical packet data at the first input from either the cross connect of the first, different buffer module or the optical packet network, sending the optical packet data through the cross connect to the optical data storage unit through the second output, storing the optical packet data in the optical storage unit, and retrieving the optical packet data from the optical storage unit through the second input.

In some embodiments, the disclosed subject matter includes the procedure wherein storing the data includes storing the data in a fiber delay line unit. In some embodiments, the disclosed subject matter includes the procedure further including receiving a read signal from either the cross connect of the first, different buffer module or the optical packet network. In some embodiments, the disclosed subject matter includes the procedure wherein the optical packet buffer includes a second, different buffer module, the second, different buffer module including a second optical data storage unit and a second cross connect, the second cross connect including two or more inputs and outputs, a third input and output adapted for connection to the cross connect of the at least one buffer module and a fourth input and output connected to the second optical data storage unit. In some embodiments, the disclosed subject matter includes the procedure further including receiving the optical packet data at the third input from the cross connect of the at least one buffer module, sending the optical packet data through the second cross connect to the second optical data storage unit through the fourth output, storing the optical packet data in the second optical storage unit, and retrieving the optical packet data from the optical storage unit through the fourth input. In some embodiments, the disclosed subject matter includes the procedure further including, at the at least one buffer module, sending the optical packet data to the second cross connect through a fifth output, sending a read signal to the second cross connect, receiving the optical packet data from the second cross connect through a fifth input, wherein the cross connect of the at least one buffer module further includes the fifth input and output, the fifth input and output adapted for connection to the second cross connect of the second, different buffer module.

In some embodiments, the disclosed subject matter includes an optical packet buffer module for storing data in an optical packet buffer that forms part of an optical packet network, including an optical data storage unit; a cross connect, connected to the optical data storage unit, including a first input and output adapted to being connected to a cross connect of a first, different buffer module or to the optical packet network, and a second input and output connected to the optical data storage unit; and a control unit adapted to routing optical data through the cross connect in response to the existence of data at the first or second inputs.

In some embodiments, the disclosed subject matter includes the optical packet buffer module wherein the optical data storage unit is a fiber delay line unit. In some embodiments, the disclosed subject matter includes the optical packet buffer module wherein the cross connect of the at least one buffer module is a 3×3 cross connect. In some embodiments, the disclosed subject matter includes the optical packet buffer module further including a read signal input adapted to being connected to the first, different buffer module or to the optical packet network. In some embodiments, the disclosed subject matter includes the optical packet buffer module wherein the cross connect further includes a third input and output adapted to being connected to a second, different buffer module, the second, different buffer module further including a second optical data storage unit; a cross connect, connected to the optical data storage unit, including a fourth input and output adapted to being connected to the cross connect of the at least one buffer module, and a fifth input and output connected to the second optical data storage unit; and a second control unit adapted to routing optical data through the second cross connect in response to the existence of data at the fourth or fifth inputs. In some embodiments, the disclosed subject matter includes the optical packet buffer module wherein the control unit is adapted to routing optical data through the cross connect in response to the existence of data at the first, second, or third inputs. In some embodiments, the disclosed subject matter includes the optical packet buffer module wherein the at least one buffer module further includes a read signal output adapted to being connected to the second, different buffer module.

In some embodiments, the disclosed subject matter includes a computing device including an optical packet buffer module for storing data in an optical packet buffer, the optical packet buffer forming part of an optical packet network, including an optical data storage unit; a cross connect, connected to the optical data storage unit, including a first input and output adapted to being connected to a cross connect of a first, different buffer module or to the optical packet network, and a second input and output connected to the optical data storage unit; and a control unit adapted to routing optical data through the cross connect in response to the existence of data at the first or second inputs.

The accompanying drawings, which are incorporated into and constitute part of this disclosure, illustrate embodiments of the invention and serve to explain the principles of the invention.

The disclosed subject matter will now be described in detail with reference to the Figures in connection with the illustrative embodiments.

DETAILED DESCRIPTION

An optical data storage system and method of use thereof are presented. The optical data storage system includes one or more optical buffer modules connected in series. Each optical buffer module includes a cross connect. Each cross connect is connected, by a pair of inputs and outputs, to an optical data storage unit, for example, a fiber delay line, by a pair to either an optical packet network or a cross connect of a first adjacent buffer module in the series, and by a pair to a cross connect of a second adjacent buffer module in the series. The buffer module also includes a read signal output line which is connected to a read signal input line of the second adjacent buffer module for transmitting a read signal. A control module within each buffer module directs the passage of data through the cross connect.

In one embodiment, an optical packet buffer of the presently described subject matter is formed of independent and identical building-block modules that are cascaded to form a complete buffer implementation. When the entire system is assembled, it has one input port for optical packets and one output port, in addition to the input and output for a read request signal, which is transmitted from the switching network or router. In this embodiment, the total capacity of the buffer equals the number of modules it contains since each contains one optical data storage unit.

The individual building-block modules can all be preprogrammed with a particular routing logic, which can allow the whole system to behave in any appropriate data storage scheme (e.g., as a FIFO (or queue) or as a LIFO (or stack) buffer). This behavior is complete and fully functional, and the buffer is transparent to the surrounding OPS system. Packets are simply stored in the structure and released upon receiving a read request signal; these processes are entirely independent.

Figure 1:
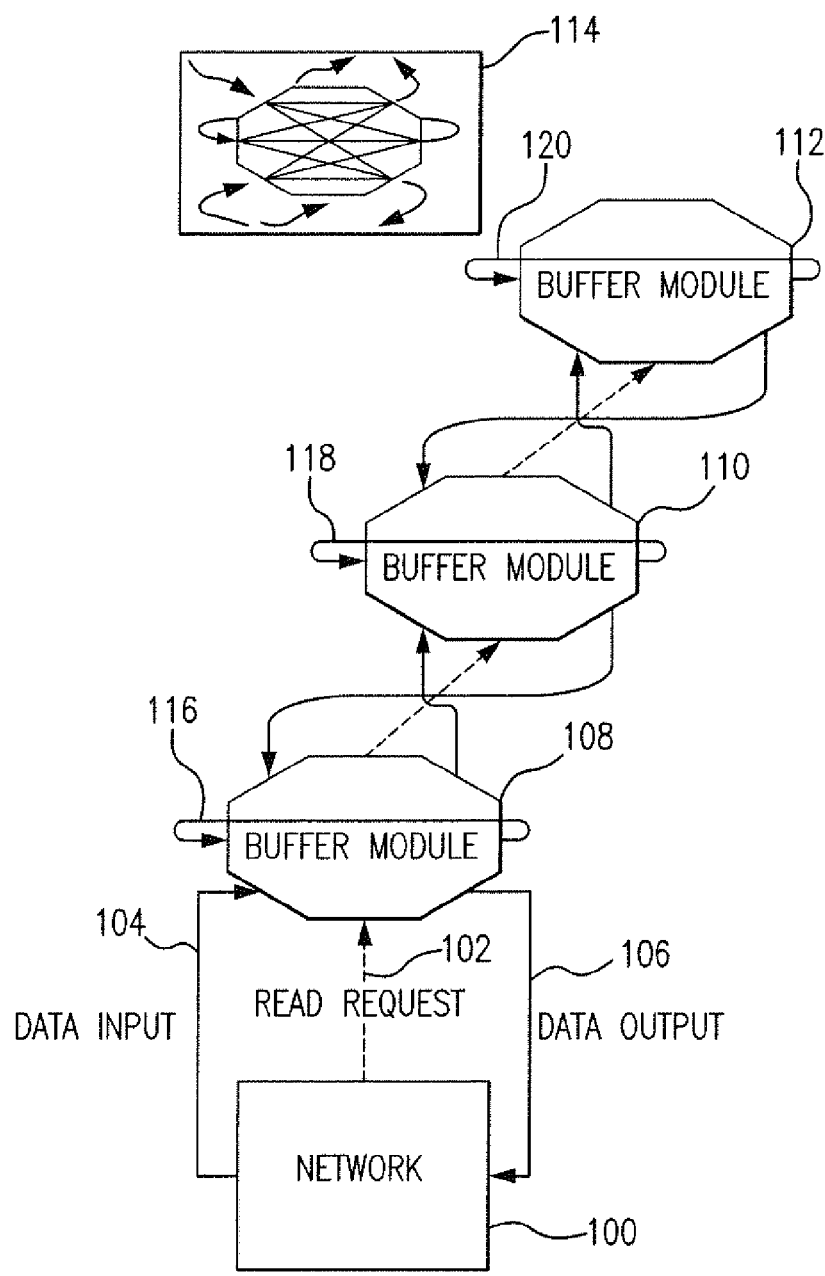
FIG. 1 is a block diagram of a system in accordance with some embodiments of the disclosed subject matter.

The buffer implementation requires no central arbitration of any kind and requires no central management; all routing and management is entirely distributed among the buffer modules, with each module functioning individually. After the root module has been inserted on a pathway between a packet source and the OPS system, an arbitrary number of modules can be cascaded laterally from it (FIG. 1). Because these modules are all self-contained and independent, it is not necessary to configure or customize the assembled buffer structure further. In addition, because the routing logic is self-contained within each module (i.e. avoiding centralized routing logic), the architecture is largely scalable.

The principles of the described subject matter permit the creation of a modular, scalable, extensible, and transparent optical storage system. The use of the described cross connects permits independent and simultaneous reads and writes because each input and output can be operated independently of the others. Supporting independent and simultaneous reads and writes permits the creation of a data storage unit that is transparent to the surrounding components and does not require those components to be modified. By transmitting and storing data completely within the optical medium, the disclosed subject matter avoids the slow nature of semiconductor storage and the costly transmissions between the optical and semiconductor media. The system is scalable and extensible owing to the fact that each buffer module operates independently of the other buffer modules. Data processing bottlenecks are avoided because each module operates independently of the others, but together, the buffer modules accomplish the operations necessary for whatever storage scheme is required. The size of the data storage unit is increased seamlessly by adding additional buffer modules to the data storage unit.

In addition, the presently described subject matter is advantageous at least because it introduces minimal latency for packets to enter empty buffers. The latency is less than a time slot and is unaffected by network load. Furthermore, the processing time does not increase with load (zero marginal routing time). This architecture reduces overall packet latency and reduces network load by preventing the need to retransmit dropped packets.

FIG. 1 is a block diagram of a system in accordance with some embodiments of the disclosed subject matter. The system includes serially connected buffer modules 108, 110, and 112. Buffer module 108 is connected to an optical packet network 100. Data input 104 and data output 106 are channels by which data is transferred to and from the network 100. Each buffer module 108, 110, and 112 includes a cross connect, as shown by the sample cross connect 114. Each buffer module includes a pair of optical connectors connecting adjacent buffer modules in the series. Buffer module 108 includes optical connectors for sending data to and from buffer module 110. Buffer modules 108, 110, and 112 are cascaded in series and each includes an optical data storage unit (116, 118, and 120, respectively) for storing optical data.

The principles of the present subject matter find application in optical networks. Optical networks include networks of computing devices as well as networks contained within a single computing device. In an optical network of computing devices, one or more computing devices are in communication over an appropriate optical network infrastructure. For example, wide or local area network elements include terminal devices, switches, routers, repeaters, amplifiers, etc. In one implementation of the present subject matter, an optical network switch, in which data exists in the optical medium, contains an optical packet buffer at each output port to resolve contention for the output port when more than one packet is to be sent out of the port at a time. In another implementation, a quality of service router for an optical network buffers data that would normally overflow the throughput of a particular channel by storing the overflow packets in an optical packet buffer. Once the channel capacity allows, the data is read from the buffer and forwarded along the channel to its destination.

Optical networks contained within a computing device include smaller networks or busses that interconnect individual components of the computing device or connect circuits within a processor or other circuitry. For example, the present subject matter finds application in a storage unit in a component bus in which data contention is resolved by temporarily storing the data until the contention has been resolved and retransmitting the data. In another implementation, a data storage unit, such as random access memory component, is constructed from various optical packet buffers. In yet another implementation, optical packet buffers find application as data storage units within circuit boards and microchips that integrate optical data transmission mechanisms.

Each buffer module 108, 110, and 112 includes a cross connect, as shown in sample cross connect 114. The cross connect 114 is responsible for transferring data from one input port to one output port at the instruction of a control module (not shown). The cross connect 114 is constructed of gates that connect the input ports and output ports. The gates can be opened by the control module. In one implementation, a cross connect of buffer module 108 includes three pairs of input and output ports. One pair of ports connects to the network 100 via data input 104 and data output 106. One pair of ports connects to the optical data storage unit 116. One pair connects to the adjacent buffer module 110 via a pair of input and output ports therebetween. The cross connect of the buffer modules includes a photonic cross-connect. In this way, data remains in the optical domain during transmission and storage. In one implementation, the cross connect is a 3×3 cross connect. It should be noted that a subset of the 3×3 cross connect can be used in the present subject matter.

The data inputs and outputs, including data input 104 and data output 106, are implemented using any appropriate optical data coupler known to those ordinarily skilled in the art.

The optical data storage unit associated with each buffer module stores the optical data for an arbitrary amount of time. For example, in one implementation, the optical data storage units are fiber delay lines. Each fiber delay line includes a length of fiber-optic cable through which the optical data passes, creating a delay and storing the data. The data is cycled through the FDL so long as the data is to be kept in the buffer module. The control module associated with the cross connect causes the data to be retransmitted through the length of FDL until the control module causes the appropriate gate to be opened and the data to be transferred out of the buffer module. The specific implementation of the optical data storage unit is immaterial to the principles of the present subject matter.

The optical data storage unit can include any appropriate constant-delay device well known to one ordinarily skilled in the art. For example, one such constant-delay device is a slow-light device (often constructed from exotic materials with particularly useful indices of refraction). Another example is a photonic crystal having a constant latency.

The control module (not shown) of each module includes logic that determines which gates to open (and thereby how data flows) based at least in part on the existence of data at the inputs of the cross connect and whether a read request signal is present on the read request input line. For example, to store data in the optical packet buffer when the optical packet buffer is empty, data is sent from the network 100 to the buffer module 108 on the data input 104. The control module determines that no read request signal is present on read request channel 102, that no data is present at the input from the optical data storage unit (i.e., no data is stored in the optical storage unit 116), and that no data is present on the data input from buffer module 110. The control module then causes the appropriate gate to be opened to send the data from the data input 104 to the output connected to the optical data storage unit 116. To retrieve the data, a read request signal is sent from the network 100 over read request channel 102. The control module detects the presence of the read request signal and that data is present at the input from the optical data storage unit 116 (i.e., the data is stored in the optical data storage unit 116). The control module then causes the appropriate gate to be opened to transfer the data from the input coming from the optical data storage unit 116 to the data output 106.

In FIG. 1, the buffer modules are arranged so that, by the nomenclature used herein, data enters and exits the bottom module and are passed upward for storage and downward to exit in response to a read request signal. The lower buffer modules in the structure remain occupied, whereas the upper ones are empty until more packets enter the buffer. Overflow occurs when each buffer module contains a packet. Then, one more packet is injected into the buffer without a simultaneous read request signal. In this case, a single packet is lost (the newest in the FIFO; the oldest in the LIFO), however, the rest of the buffer remains intact and coherent.

In this implementation, each buffer module stores one packet at a time in its FDL. By permitting buffer modules to pass packets between adjacent buffer modules without limitation, the buffer maintains the ordering required by the FIFO, LIFO, or other prioritization schemes. It is of course possible to store multiple packets in the same or parallel buffers in a single optical data storage unit, for example, where the buffering scheme stores and retrieves multiple packets at a time.

The behavior of a buffer module that implements the FIFO and LIFO schemes is similar. Differences occur when managing the order of the packets within the buffer, depending on which prioritization scheme is used. Other implementations of prioritization schemes, such as priority queues or random access, are contemplated for implementation using the principles of the present subject matter. The present subject matter is programmable, and therefore flexible, leading to the ability to seamlessly implement various prioritization schemes, depending on the needs of the optical network technology.

Table 1 shows an exemplary truth table for an implementation of an FIFO prioritization scheme using the principles of the present subject matter.

For the FIFO prioritization (Table 1), when a packet enters a buffer module (via the down or "D" port), it is passed up to the next empty buffer module (via the up or "U" port), ensuring that older packets are the first to exit the queue. When a buffer module receives a cascaded read request signal, it sends its packet down to the lower buffer module and propagates the read request signal up the chain to the next buffer module, which results in another packet being sent down to it. This scheme ensures that packets are placed in adjacent buffer modules, so that the buffer can be read out as quickly and efficiently as possible. When a read request signal is sent to an empty buffer module, the read request signal does not need to propagate further since that buffer module is the last used buffer module in the chain. When a packet enters an unoccupied buffer module at the same time that a read request signal is received, it is immediately sent down to the lower buffer module. When no read request signals are present, packets are circulated within the FDLs of each buffer module to hold the state of the buffer. An implementation of a cross connect for the FIFO prioritization scheme is shown in FIG. 2a.

Figure 2A:
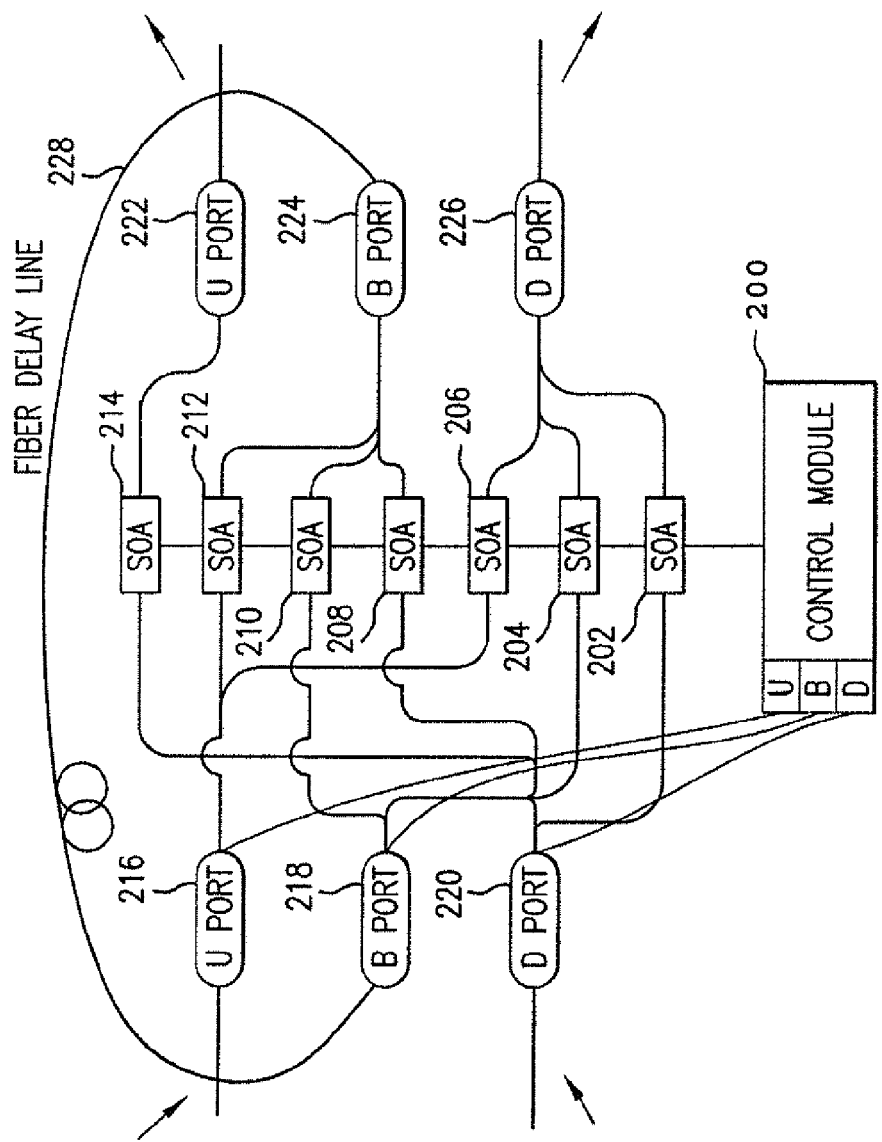
FIGS. 2a and 2b are block diagrams of systems in accordance with some additional embodiments of the disclosed subject matter.

FIG. 2a is a block diagram of a system in accordance with some additional embodiments of the disclosed subject matter. The system depicts a buffer module that implements the FIFO prioritization scheme and includes a control module 200, a fiber delay line 228, and a cross connect. The cross connect includes semiconductor optical amplifiers (SOAs) 202-214, U, B, and D ports 216, 218, and 220, and U, B, and D ports 222, 224, and 226. The U port 216, B port 218, and D port 220 depict input ports while the U port 222, B port 224, and D port 226 depict output ports. Data received from the next buffer module "up" the cascade chain is received on the U port 216. Data received from the next buffer module "down" the chain is received on the D port 220. Similarly, data sent to the next buffer module "up" the chain is sent through U port 222, and data sent "down" to the next module is sent through D port 226. Data to be stored is sent through the B port 224. The data then enters the fiber delay line 228 and arrives on the B port 218 once it has propagated through the fiber delay line 228. Lines connecting the input ports to the output ports demonstrate the possible pathways that data can travel in the FIFO prioritization scheme under the control of the control module 200. For example, the FIFO scheme depicted includes a data path from U port 216 to B port 224 and a path from U port 216 to D port 226. Each of these data paths is enabled when necessary by individual gates controlled by the control module 200. For example, gates U2B and U2D can be used for the above data paths. Once a data path is enabled, data is able to flow between one input port to the corresponding output port.

Table 2 shows a sample truth table for an implementation of an LIFO prioritization scheme using the principles of the present subject matter.

TABLE 1

Truth Table for FIFO Prioritization Scheme

| D | B | U | R | D2D | D2B | D2U | B2D | B2B | B2U | U2D | U2B | U2U | RO | |
|---|---|---|---|-----|-----|-----|-----|-----|-----|-----|-----|-----|----|---|
| 0 | 0 | 0 | X |     |     |     |     |     |     |     |     |     |    | EMPTY QUEUE |
| 1 | 0 | 0 | 0 |     | 1   |     |     |     |     |     |     |     |    | WRITE |
| 0 | 1 | 0 | 0 |     |     |     |     | 1   |     |     |     |     |    | HOLD |
| 1 | 1 | 0 | 0 |     |     | 1   |     | 1   |     |     |     |     |    | SUBSEQUENT WRITE |
| 0 | 0 | 1 | 0 |     |     |     |     |     |     |     |     | 1   |    | AFTER READ |
| 1 | 0 | 1 | 0 |     |     | 1   |     |     |     |     |     | 1   |    | WRITE AFTER READ |
| X | 1 | 1 | X |     |     |     | INACCESSIBLE STATE | | | | | | | |
| 1 | 0 | 0 | 1 | 1   |     |     |     |     |     |     |     |     |    | READ AND WRITE (LAST MODULE) |
| 0 | 1 | 0 | 1 |     |     |     |     | 1   |     |     |     |     | 1  | READ |
| 1 | 1 | 0 | 1 |     |     | 1   | 1   |     |     |     |     |     | 1  | READ AND WRITE |
| 0 | 0 | 1 | 1 |     |     |     |     |     | 1   |     |     |     | 1  | SUBSEQUENT READ |
| 1 | 0 | 1 | 1 |     |     | 1   |     |     | 1   |     |     |     | 1  | SUBSEQUENT READ AND WRITE (ROOT MODULE) |

TABLE 2

Truth Table for LIFO Prioritization Scheme

| D | B | U | R | D2D | D2B | D2U | B2D | B2B | B2U | U2D | U2B | U2U | RO | |
|---|---|---|---|-----|-----|-----|-----|-----|-----|-----|-----|-----|----|---|
| 0 | 0 | 0 | X |     |     |     |     |     |     |     |     |     |    | EMPTY QUEUE |
| 0 | 0 | 0 | X |     |     |     |     |     |     |     |     |     |    | EMPTY STACK |
| 1 | 0 | 0 | 0 |     | 1   |     |     |     |     |     |     |     |    | WRITE |
| 0 | 1 | 0 | 0 |     |     |     |     | 1   |     |     |     |     |    | HOLD |
| 1 | 1 | 0 | 0 |     | 1   |     |     |     |     |     | 1   |     |    | SUBSEQUENT WRITE |

TABLE 2-continued

Truth Table for LIFO Prioritization Scheme

| D | B | U | R | D2D | D2B | D2U | B2D | B2B | B2U | U2D | U2B | U2U | RO |
|---|---|---|---|---|---|---|---|---|---|---|---|---|---|
| 0 | 0 | 1 | 0 |   |   |   |   |   |   |   | 1 |   | AFTER READ |
| 1 | 0 | 1 | 0 | 1 |   |   |   |   |   |   | 1 |   | WRITE AFTER READ |
| X | 1 | 1 | X |   |   |   | INACCESSIBLE STATE |   |   |   |   |   |   |
| 1 | 0 | 0 | 1 | 1 |   |   |   |   |   |   |   |   | READ AND WRITE (ROOT MODULE) |
| 0 | 1 | 0 | 1 |   |   |   | 1 |   |   |   |   |   | 1 READ |
| 1 | 1 | 0 | 1 | 1 |   |   |   | 1 |   |   |   |   | READ AND WRITE (ROOT MODULE) |
| 0 | 0 | 1 | 1 |   |   |   |   |   |   | 1 |   |   | 1 SUBSEQUENT READ |
| 1 | 0 | 1 | 1 | 1 |   |   |   |   |   |   | 1 |   | SUBSEQUENT READ AND WRITE (ROOT MODULE) |

Figure 2B:
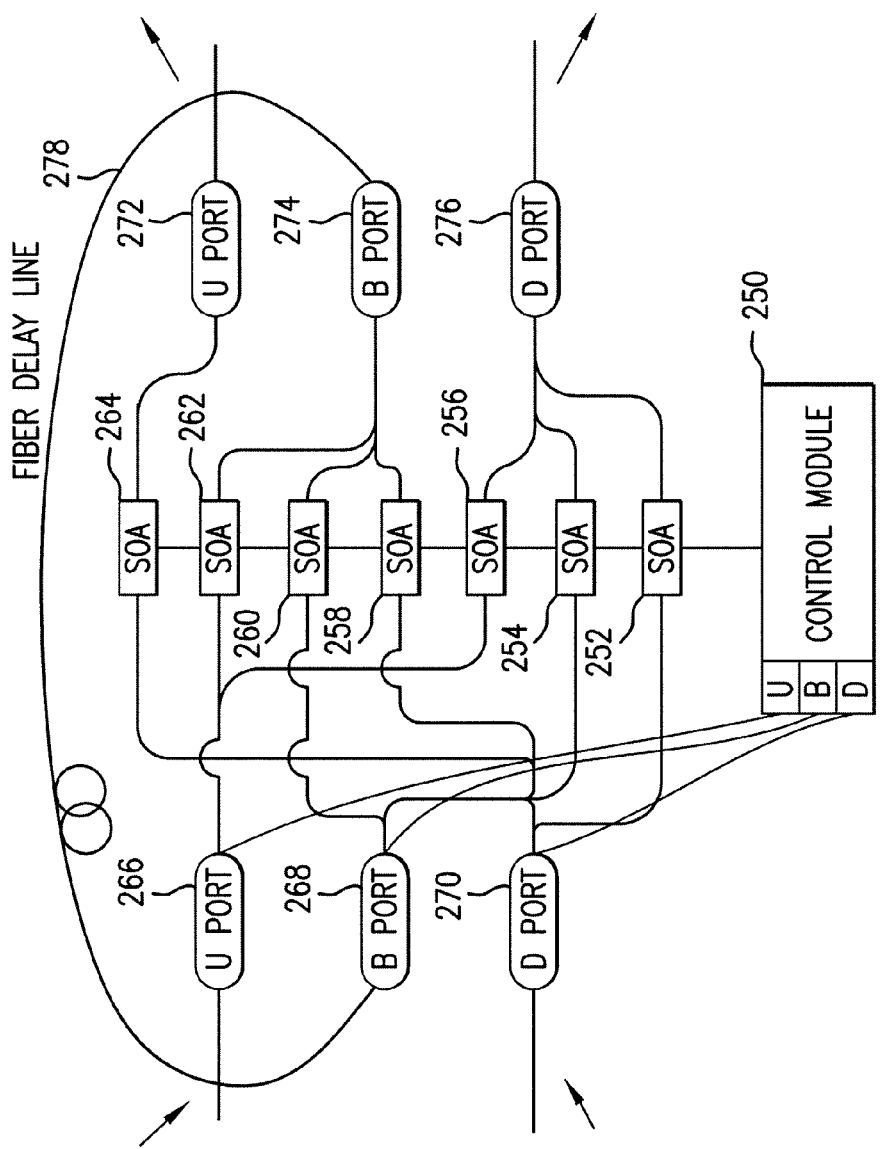

FIG. 2b is a block diagram of a system in accordance with some additional embodiments of the disclosed subject matter. The system depicts a buffer module that implements the LIFO prioritization scheme and includes a control module 250, a fiber delay line 278, and a cross connect. The cross connect includes SOAs 252-264, U, B, and D ports 266, 268, and 270, and U, B, and D ports 272, 274, and 276. The U port 266, B port 268, and D port 270 depict input ports while the U port 272, B port 274, and D port 276 depict output ports. Data received from the next buffer module "up" the cascade chain is received on the U port 276. Data received from the next buffer module "down" the chain is received on the D port 270. Similarly, data sent to the next buffer module "up" the chain is sent through U port 272, and data sent "down" to the next module is sent through D port 276. Data to be stored is sent through the B port 274. The data then enters the fiber delay line 278 and arrives on the B port 268 once it has propagated through the fiber delay line 278. Lines connecting the input ports to the output ports demonstrate the possible pathways that data can travel in the LIFO prioritization scheme under the control of the control module 250.

Figure 3A:
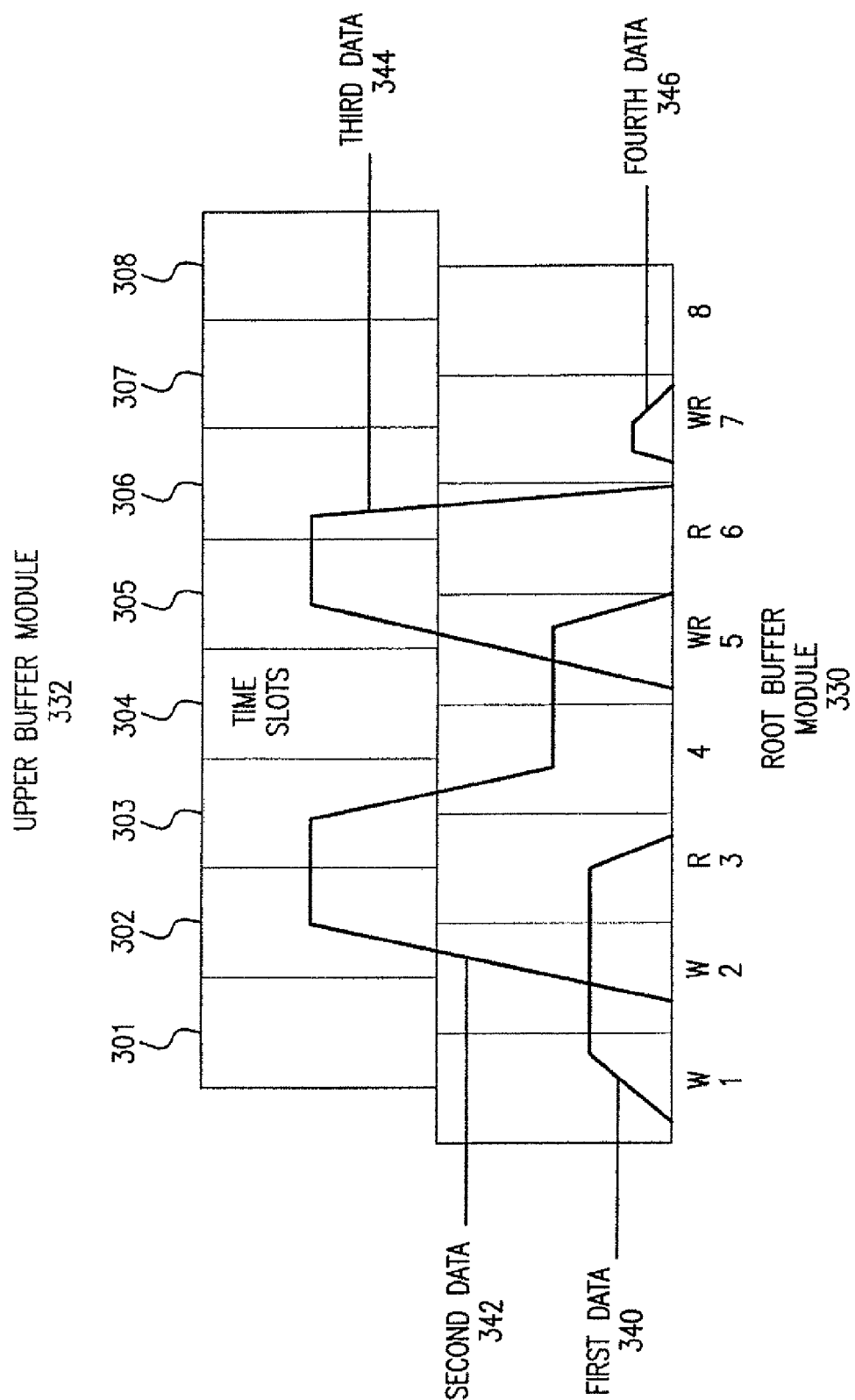
FIGS. 3a and 3b are timing diagrams in accordance with some embodiments of the disclosed subject matter.

FIG. 3a is a timing diagram in accordance with some embodiments of the disclosed subject matter. FIG. 3a depicts the path of data through an exemplary optical packet buffer under a FIFO prioritization scheme. The optical packet buffer includes two buffer modules (an upper module 332 and root module 330). It should be noted that spatial terms, including "upper," "lower," "up," and "down" are used for the convenience of describing the present subject matter and do not necessarily indicate physical relationships between the individual components. The timing for the operations is divided into eight timeslots 301-308. During each time slot, the letters "W" and "R" indicate a "write" or "read" operation on the optical packet buffer respectively during that timeslot. The root buffer module 330 is connected to an optical packet network. The upper buffer module 332 is connected to the buffer module 330 such that data bound for the upper buffer module 332 passes through the root buffer module 330. The timeslots 301-308 are configured such that they are at least as long as the time it takes for optical data to propagate through an optical data storage unit.

During the first timeslot 301, a first data 340 is offered to the root (lower) buffer module 330 (i.e., through a write operation). Since the optical data storage unit of the root buffer module 330 is empty and no read request signal is received, the control module of the root buffer module 330 directs the first data 340 into the optical data storage unit of the root buffer module 330 by activating the D2B gate.

During a second timeslot 302, a second data 342 is presented to the root buffer module 330 using a write operation. Because the root buffer module 330's optical data storage unit is now occupied, the root buffer module 330 sends the second data 342 up to the upper buffer module 332 by enabling the D2U gate. Because the upper buffer module 332 is empty, it performs operations similar to those the root buffer module 330 performed during the first timeslot 301: the data is sent to its optical data storage unit using the D2B gate. Meanwhile, the first data 350 is held in the root buffer module's optical data storage unit by using the B2B gate.

A read operation is performed during the third timeslot 303. A read request signal is sent to the root buffer module 330. To maintain FIFO ordering, the first data 340, which is in the root buffer module 330's optical data storage unit and which is older than the second data 342, egresses from the root buffer module 330, and hence the optical packet buffer, by the B2D gate. The root buffer module 330 also propagates the read request signal to the upper buffer module 332, which behaves in an identical way: it sends the second data 342 down to the root buffer module 330 via B2D. The second data 342 will reach the root module (now into the up port of the root buffer module 330) at the beginning of the next timeslot.

For the fourth timeslot 304, no read or write operation occurs. Thus, the second data 342 that is entering the root buffer module 330 through the up port is directed to the root buffer module 330's optical data storage unit with U2B. (It is important to note that read and write operations could be correctly performed during this timeslot as well, independent of other activity within the modules. In those cases, the logic on the "subsequent read" or "write after read" lines from Table 1 is executed.)

During the fifth timeslot 305, a simultaneous read-write operation occurs. To maintain FIFO prioritization, the second data 342 in the root buffer module 330's optical data storage unit is allowed to egress via the B2D gate. Simultaneously and independently, a new, third data 344 is sent up to the upper buffer module 332 with the D2U gate at the same time that a read request signal propagates to that buffer module. The upper buffer module 332 encounters both the incoming third data 344 and the read request signal simultaneously. As a result, the third data 344 is sent back to the root buffer module 330 through the upper buffer module 332's D2D gate. Although this functionality can seem redundant, the effect is to hold the third data 354 between the two modules for a single timeslot, buffering it in a manner similar to an optical data storage unit, since the third data 354 enters the root buffer module 330 (through the up port) only at the beginning of the next timeslot.

The sixth timeslot 306 includes a read operation. Because the third data 344 comes from the upper buffer module 332, the root buffer module 330 enables the U2D gate, allowing the third data 344 to egress from the queue. A read request signal is also propagated upward since the root buffer module 330 has no information about whether the upper buffer module 332 is empty or not.

The seventh timeslot 307 includes another simultaneous read-write operation, but because the optical packet buffer is empty, the execution differs from that which occurred for the root buffer module 330 during the fifth timeslot 305. The root buffer module 330 instead behaves similarly to the upper buffer module 332 during the fifth timeslot 305. Its D2D gate routes a fourth data 346 back out of the optical packet buffer. Because the root buffer module 330's optical data storage unit was empty, the remaining modules are empty, and propagation of the read request signal is halted.

Finally, on the eighth timeslot, the optical packet buffer rests.

The LIFO prioritization (Table 2) is similar to the FIFO prioritization. However, instead of sending new data up to the end of the optical packet buffer, it is instead stored in the root buffer module, pushing other data further up the buffer module stack. Thus, the first data to exit the stack on a read request signal is actually the newest one.

Figure 3B:
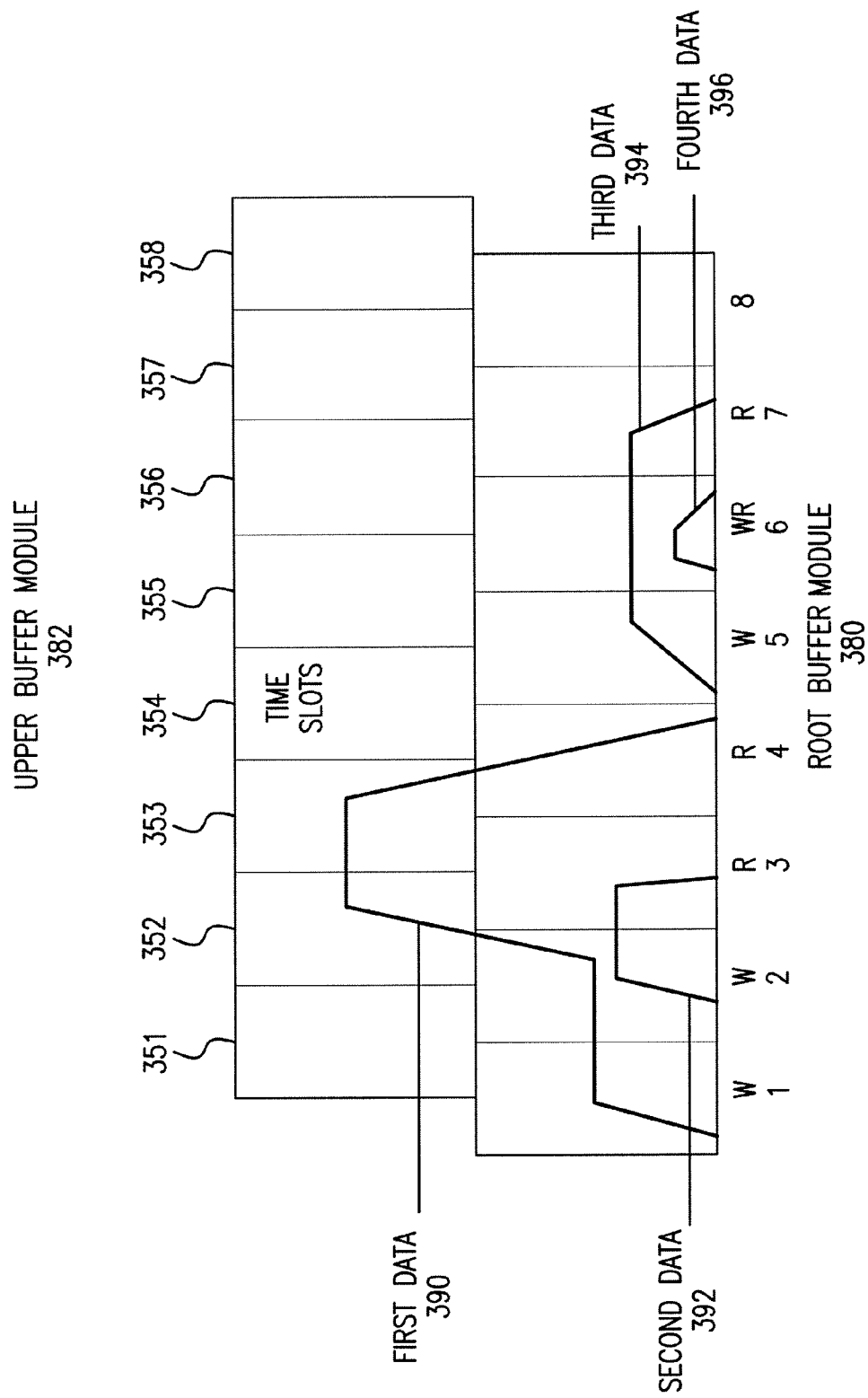

FIG. 3b is a timing diagram in accordance with some embodiments of the disclosed subject matter. FIG. 3b depicts the path of data through an exemplary optical packet buffer under a LIFO prioritization scheme. The optical packet buffer includes two buffer modules (an upper module 382 and root module 380). Again, it should be noted that spatial terms, including "upper," "lower," "up," and "down" are used for the convenience of describing the present subject matter and do not necessarily indicate physical relationships between the individual components. The timing for the operations is divided into eight timeslots 351-358. During each time slot, the letters "W" and "R" indicate a "write" or "read" operation on the optical packet buffer, respectively, during that timeslot. The root buffer module 380 is connected to an optical packet network. The upper buffer module 382 is connected to the buffer module 380 such that data bound for the upper buffer module 382 passes through the root buffer module 380. The timeslots 351-358 are configured such that they are at least as long as the time it takes for optical data to propagate through an optical data storage unit.

The root buffer module 380 receives a first data 390 during the first timeslot 351. Because the stack is empty, the first data 390 is to be stored in the root buffer module 380's optical data storage unit and is directed there by the D2B gate.

The second data 392 ingresses into the root buffer module 380 during the second timeslot 352. Because the root buffer module 380 already contains data, the first data 390 is sent up to the upper buffer module 382 through the B2U gate.

The root buffer module 380 and the upper buffer module 382 both receive their new data and store them in their respective optical data storage units (first data 390 in the upper buffer module 382 and the second data 392 in the root buffer module 380) with the respective D2B gates, similar to what the root buffer module 380 did in the first timeslot 351.

During the third timeslot 353, a read request signal is received. The root buffer module 380 causes the second data 392 to egress the buffer through the B2D gate. The read request signal is propagated to the upper buffer module 382, which also enables its B2D gate, causing the first data 390 to be sent down to the root buffer module 380.

Another read operation (by way of a read request signal) occurs during the fourth timeslot 354. In this case, the root buffer module 380 causes the first data 390, sent from the upper buffer module 382 during the previous timeslot, to egress through the U2D gate. The read request signal is propagated to the upper buffer module 382, but because that module is empty, the read request signal is curtailed.

The fifth timeslot 355 is similar to the first timeslot 351. A third data 394 is received by the root buffer module 380 and stored in its optical data storage unit.

In the sixth timeslot 356, a simultaneous read-write operation is executed. The root buffer module 380 continues to store the third data 394 in its optical data storage unit with the B2B gate while at the same time a read request signal and a fourth data 396 are received. The root buffer module 380 causes the fourth data 396 to egress the optical packet buffer through the D2D gate. The data is handled independently in the root buffer module 380 for this operation, and the root buffer module 380 is the one buffer module in the LIFO implementation that executes this particular functionality. Moreover, because no changes to the buffer structure occur outside of the root buffer module 380, propagating the read request signal further is unnecessary. It should be noted that in some embodiments, the U2B gate can also be used simultaneously with the D2D gate.

A read operation is performed during the seventh timeslot 357. The root buffer module 380 reads the third data 394 from its optical data storage unit and sends the data out using the B2D gate. Finally, on the eighth timeslot 358, the optical packet buffer rests.

In one embodiment, buffer modules that implement the desired functionality can be assembled from conventional photonic and fiber-optic components in a relatively straight-forward manner. Electrically controlled SOA switching gates are used to implement the appropriate subset of the 3×3 structure. Standard fiber-optic couplers combine and divide the necessary pathways; optical filters are not necessary. A small amount of power is tapped from each of the three inputs and directed to low-speed optical receivers in order to determine the presence or absence of data. These three signals, in addition to an electronic read request signal transmitted over microwave cables, are the inputs used to execute the routing decision by a standard commercial complex programmable logic device (CPLD), as specified by Tables I and II, or by any similar table that could implement other priority schemes.

While the routing decision is computed by the CPLD, the data is held in a short length of fiber. Then, the appropriate SOAs are enabled, so that the data is routed to the correct module output. An electronic read request signal can also propagate to the next module in the buffer. This part of the node latency is approximately 22 ns. Data that then ascends the optical packet buffer propagates through a fiber delay of approximately 15 ns before reaching the next module. Data that descends the optical packet buffer faces a 65-ns delay. Data that remains buffered within the module is held in an optical data storage unit (e.g., an FDL) with a latency of approximately 80 ns. With this timing arrangement, the implemented system functions correctly with 102-ns timeslots. The data is approximately 90 ns long, allowing for 12 ns of dead-time between the packets, which is more than enough to accommodate the SOA gate switching time of less than 2 ns. This implementation can be adjusted to support other timeslot lengths by increasing or decreasing the length of fiber in the modules' optical data storage unit.

Data can remain in the optical domain throughout its lifetime in the buffer, and because wideband components (i.e., SOAs and couplers and all-optical components) can be used in the optical paths, the optical packet buffer can transparently route optical data that contains wavelengths over nearly all of the C-band. This optical data can also have a multiple-wavelength (wavelength-striped) format.

The gain of the SOAs can be set to compensate for the coupler losses found in their particular branch of the 3×3 cross connect. Because these losses depend on which branches are required for a particular module implementation, the SOAs are set, in one embodiment, to deliver between 6 and 11 dB of gain, which requires between 45 and 75 mA of drive current. The net gain or loss incurred on each packet payload can be kept to less than about 0.5 dB In other implementations, the presently described subject matter is implemented using photonic integrated circuits in which various light wave devices are integrated on to a single substrate (e.g., silicon or silica). The integration on to a substrate can include electronic microchips or electronic integrated circuits. In some implementations, the presently described buffer modules are implemented using photonic integrated circuits while the control modules and read request circuits are implemented using traditional integrated circuits.

In some implementations, the cross connect includes various numbers of inputs and outputs, such as 4×4, 3×4, 2×3, etc.

The foregoing merely illustrates the principles of the disclosed subject matter. Various modifications and alterations to the described embodiments will be apparent to those skilled in the art in view of the teachings herein. It will thus be appreciated that those skilled in the art will be able to devise numerous techniques which, although not explicitly described herein, embody the principles of the disclosed subject matter and are thus within the spirit and scope thereof.

The invention claimed is:

1. A method for storing data in an optical packet buffer that forms part of an optical packet network, the optical packet buffer including at least a first buffer module including a first optical data storage unit and a first cross connect, the first cross connect including three or more inputs and outputs, a first input and output adapted for connection to the optical packet network, a second input and output connected to the optical data storage unit, and a third input and output connected to a second buffer module, comprising:
receiving first optical packet data at the first input from the optical packet network;
sending the first optical packet data through the first cross connect to the first optical data storage unit through the second output;
storing the first optical packet data in the first optical storage unit;
upon receiving second optical packet data at the first input from the optical packet network, sending the first optical packet data through the first cross connect to the second buffer module through the third output;
storing the second optical packet data in the first optical storage unit; and
retrieving the first and second optical packet data through the first output.

2. The method of claim 1, wherein storing the first optical packet data includes storing the data in a fiber delay line unit coupled to the second input and output.

3. The method of claim 1, wherein the retrieving further comprises receiving a read signal from the optical packet network.

4. The method of claim 1, wherein the second buffer module includes a second optical data storage unit and a second cross connect, the second cross connect including two or more inputs and outputs, a fourth input and output adapted for connection to the cross connect of the first buffer module and a fifth input and output connected to the second optical data storage unit.

5. The method of claim 4, further comprising:
receiving the first optical packet data at the fourth input from the cross connect of the first buffer module;
sending the first optical packet data through the second cross connect to the second optical data storage unit through the fifth output;
storing the first optical packet data in the second optical storage unit; and
retrieving the first optical packet data from the second optical storage unit through the fourth output, the third input, and the first output.

6. The method of claim 1, wherein the optical packet buffer comprises a last-in-first-out packet buffer, and wherein the retrieving further comprises:
retrieving the second optical packet data from the first optical storage unit through the second input and the first output; and
retrieving the first optical packet data from the second buffer module through the third input and the first output.

7. The method of claim 6, wherein the retrieving the first optical packet data further comprises:
receiving the first optical packet data from the second buffer module at the first optical storage unit through the third input and second output;
storing the first optical packet data in the first optical storage unit; and
receiving at the optical packet network the first optical packet data through the second input and the first output.

8. The method of claim 1, wherein the optical packet buffer comprises a first-in-first-out packet buffer, and wherein the retrieving further comprises:
retrieving the first optical packet data from the second buffer module through the third input and the first output; and
retrieving the second optical packet data from the first optical storage unit through the second input and the first output.

9. An optical packet buffer module for storing data in an optical packet buffer that forms part of an optical packet network, comprising:
an optical data storage unit;
a cross connect, connected to the optical data storage unit, comprising:
a first input and output adapted to being connected to the optical packet network; and
a second input and output connected to the optical data storage unit;
a third input and output adapted to being connected to a second buffer module; and
a control unit adapted to routing first optical packet data from the first input to the optical data storage unit through the second output, and, upon receiving second optical packet data, routing the first optical packet data through the cross connect to the second buffer module through the third output.

10. The optical packet buffer module of claim 9, wherein the optical data storage unit is a fiber delay line unit coupled to the second input and output.

11. The optical packet buffer module of claim 9, wherein the cross connect is a 3×3 cross connect.

12. The optical packet buffer module of claim 9, further comprising:
a read signal input adapted to being connected to the optical packet network.

13. The optical packet buffer module of claim 9, wherein the second buffer module further comprises:
- a second optical data storage unit;
- a second cross connect, connected to the second optical data storage unit, comprising:
  - a fourth input and output adapted to being connected to the third input and output of the cross connect; and
  - a fifth input and output connected to the second optical data storage unit; and
- a second control unit adapted to routing optical data through the second cross connect in response to the existence of data at the fourth or fifth inputs.

14. The optical packet buffer module of claim 13, wherein the control unit is adapted to routing optical data through the cross connect in response to the existence of data at the first, second, or third inputs.

15. The optical packet buffer module of claim 13, further comprising a read signal output adapted to being connected to the second buffer module.

16. A method for storing data in an optical packet buffer that forms part of an optical packet network, the optical packet buffer including at least a first buffer module including a first optical data storage unit and a first cross connect, the first cross connect including three or more inputs and outputs, a first input and output adapted for connection to the optical packet network, a second input and output connected to the optical data storage unit, and a third input and output connected to a second buffer module, comprising:
- receiving first optical packet data at the first input from the optical packet network;
- sending the first optical packet data through the first cross connect to the first optical data storage unit through the second output;
- storing the first optical packet data in the first optical storage unit;
- upon receiving second optical packet data at the first input from the optical packet network, sending a selected one of the first or second optical packet data through the first cross connect to the second buffer module through the third output;
- retrieving the other of the selected one of the first or second optical packet data through the second input and the first output;
- sending the selected one of the first or second optical packet data through the first cross connect to the first optical data storage unit through the third input and the second output; and
- storing the selected one of the first or second optical packet data in the first optical storage unit.

17. The method of claim 16, further comprising retrieving the selected one of the first or second optical packet data through the second input and the first output.

18. The method of claim 17, wherein the selected one of the first or second optical packet data is the second optical packet data and where the optical packet buffer comprises a first-in-first-out packet buffer.

19. The method of claim 17, wherein the selected one of the first or second optical packet data is the first optical packet data and where the optical packet buffer comprises a last-in-first-out packet buffer.

\* \* \* \* \*